(12) United States Patent
Slavens et al.

(10) Patent No.: US 10,494,929 B2
(45) Date of Patent: Dec. 3, 2019

(54) COOLED AIRFOIL STRUCTURE

(71) Applicant: United Technologies Corporation, Hartford, CT (US)

(72) Inventors: Thomas N. Slavens, Vernon, CT (US); Brooks E. Snyder, Glastonbury, CT (US); Andrew D. Burdick, Somers, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 675 days.

(21) Appl. No.: 14/804,424

(22) Filed: Jul. 21, 2015

(65) Prior Publication Data

US 2016/0177736 A1 Jun. 23, 2016

Related U.S. Application Data

(60) Provisional application No. 62/028,502, filed on Jul. 24, 2014.

(51) Int. Cl.
*F01D 5/18* (2006.01)

(52) U.S. Cl.
CPC ........ *F01D 5/187* (2013.01); *F05D 2240/306* (2013.01); *F05D 2250/314* (2013.01); *F05D 2260/201* (2013.01); *Y02T 50/676* (2013.01)

(58) Field of Classification Search
CPC . F01D 5/18; F01D 5/187; F01D 5/188; F05D 2240/306; F05D 2250/314; F05D 2260/201; Y02T 50/676
USPC ......................................... 415/115; 416/97 R
See application file for complete search history.

(56) References Cited

U.S. PATENT DOCUMENTS

| | | | |
|---|---|---|---|
| 5,462,405 A | 10/1995 | Hoff et al. | |
| 5,711,650 A | 1/1998 | Tibbott et al. | |
| 5,816,777 A | 10/1998 | Hall | |
| 5,967,752 A | 10/1999 | Lee et al. | |
| 6,254,333 B1 * | 7/2001 | Merry | F01D 5/187 29/889.2 |
| 6,874,987 B2 | 4/2005 | Slinger et al. | |
| 6,902,372 B2 * | 6/2005 | Liang | F01D 5/14 415/115 |
| 6,905,301 B2 * | 6/2005 | Tiemann | F01D 5/189 415/115 |
| 7,097,426 B2 * | 8/2006 | Lee | F01D 5/187 416/96 R |
| 7,278,826 B2 | 10/2007 | Blaskovich et al. | |
| 7,413,407 B2 * | 8/2008 | Liang | F01D 5/186 416/97 R |
| 7,416,390 B2 * | 8/2008 | Liang | F01D 5/187 416/97 R |
| 7,481,623 B1 | 1/2009 | Liang | |
| 7,780,413 B2 * | 8/2010 | Liang | F01D 5/186 416/97 R |

(Continued)

OTHER PUBLICATIONS

Extended EP Search Report for European Application No. 15178080.6 dated Dec. 11, 2015.

*Primary Examiner* — Jason D Shanske
*Assistant Examiner* — Eric J Zamora Alvarez
(74) *Attorney, Agent, or Firm* — Carlson, Gaskey & Olds, P.C.

(57) ABSTRACT

An airfoil structure for a gas turbine engine includes an airfoil that includes a suction side cooling circuit with at least two segments that are connected by at least one impingement passage.

17 Claims, 2 Drawing Sheets

(56) References Cited

U.S. PATENT DOCUMENTS

| | | | |
|---|---|---|---|
| 7,980,821 B1 * | 7/2011 | Liang | F01D 5/187 |
| | | | 416/96 R |
| 8,047,789 B1 * | 11/2011 | Liang | F01D 5/147 |
| | | | 416/97 R |
| 8,366,395 B1 | 2/2013 | Liang | |
| 2008/0170946 A1 | 7/2008 | Brittingham | |
| 2013/0156601 A1 | 6/2013 | Propheter-Hinckley et al. | |
| 2013/0280092 A1 | 10/2013 | Xu | |
| 2014/0010632 A1 | 1/2014 | Spangler et al. | |
| 2014/0010666 A1 | 1/2014 | Hudson et al. | |
| 2014/0060084 A1 | 3/2014 | Gregg et al. | |

\* cited by examiner

COOLED AIRFOIL STRUCTURE

CROSS-REFERENCE TO RELATED APPLICATIONS

This application claims priority to U.S. Provisional Application No. 62/028,502, which was filed on Jul. 24, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In the pursuit of ever high efficiencies, gas turbine engine manufacturers have long relied on high turbine inlet temperatures to provide boosts to overall engine performance. In typical modern gas turbine engine applications, the gas path temperatures within the turbine section exceed the melting point of the component constituted materials. In order to operate the gas turbine engine at these temperatures, dedicated cooling air is extracted from the compressor section and used to cool the gas path components in the turbine section. The use of compressed air from the compressor section for cooling purposes decreases the efficiency of the gas turbine engine because the compressor section must produce more compressed air than is necessary for combustion. Therefore, minimizing the use of cooling air in the turbine section is of particular importance.

The coriolis effect negatively impacts suction side heat transfer performance on rotating airfoils, such as turbine blades. The coriolis effect forces the air off the suction side of the airfoil causing a secondary flow rotation that scrubs the pressure side of the airfoil and leaves very large and separated boundary layers on the suction side. These separated boundary layers have poor heat transfer capability due to low near-wall thermal gradient. This effect is exacerbated in flows that are radially inward in nature. Under the coriolis effect, the suction side loss of heat transfer of the rotating airfoil is typically accompanied by a boost in pressure side heat transfer. Therefore, there is a need to augment the effectiveness of suction-side rotating airfoil cooling

SUMMARY

In one exemplary embodiment, an airfoil structure for a gas turbine engine includes an airfoil that includes a suction side cooling circuit with at least two segments that are connected by at least one impingement passage.

In a further embodiment of the above, an outlet of the impingement passage is directed toward a suction side of the airfoil.

In a further embodiment of any of the above, the outlet is primarily directed radially.

In a further embodiment of any of the above, the suction side cooling circuit includes at least one longitudinally extending section.

In a further embodiment of any of the above, at least one of the longitudinally extending sections includes the multiple segments.

In a further embodiment of any of the above, the suction side cooling circuit extends in a serpentine pattern.

In a further embodiment of any of the above, an outlet of the impingement passage is directed radially inward from an inlet of the impingement passage toward a suction side of the airfoil.

In a further embodiment of any of the above, the airfoil includes a central wall and a pressure side cooling circuit with the central wall dividing the pressure side cooling circuit and the suction side cooling circuit.

In a further embodiment of any of the above, a pressure side cooling circuit extends along a pressure side of the airfoil. A leading edge cooling circuit extends along a leading edge of the airfoil. A trailing edge cooling circuit extends along a trailing edge of the airfoil and a central wall dividing the pressure side cooling circuit from the suction side cooling circuit.

In a further embodiment of any of the above, a platform with the airfoil extends from the platform.

In another exemplary embodiment, a gas turbine engine section includes a rotor that is configured to rotate about an axis of rotation. An airfoil structure includes a root portion that is configured to engage the rotor. An airfoil includes a suction side cooling circuit that has multiple segments connected by at least one impingement passage.

In a further embodiment of the above, the at least one impingement opening extends in a direction of rotation of the rotor.

In a further embodiment of any of the above, an outlet of the impingement passage is directed radially inward from an inlet of the impingement passage toward a suction side of the airfoil.

In a further embodiment of any of the above, suction side cooling circuit includes multiple longitudinally extending passages and at least one of the longitudinally extending passages includes the multiple segments connected by the at least one impingement passage.

In a further embodiment of any of the above, a pressure side cooling circuit extends along a pressure side of the airfoil. A leading edge cooling circuit extends along a leading edge of the airfoil. A trailing edge cooling circuit extends along a trailing edge of the airfoil and a central wall divides the pressure side cooling circuit from the suction side cooling circuit.

In another exemplary embodiment, a method of cooling an airfoil for a gas turbine engine includes directing a cooling fluid into multiple passages that extend through a suction side of an airfoil and directing the cooling fluid through at least one impingement passage directed toward a suction side of the airfoil.

In a further embodiment of the above, at least one impingement passage extends in a direction of rotation of the gas turbine engine.

In a further embodiment of any of the above, between approximately 20% and 70% of the cooling fluid is directed in the direction of rotation of the gas turbine engine.

In a further embodiment of any of the above, the airfoil includes a pressure side cooling circuit that extends along a pressure side of the airfoil. A leading edge cooling circuit extends along a leading edge of the airfoil. A trailing edge cooling circuit extends along a trailing edge of the airfoil and a central wall divides the pressure side cooling circuit from the suction side cooling circuit.

The various features and advantages of this disclosure will become apparent to those skilled in the art from the following detailed description. The drawings that accompany the detailed description can be briefly described as follows.

DETAILED DESCRIPTION

Figure 1:
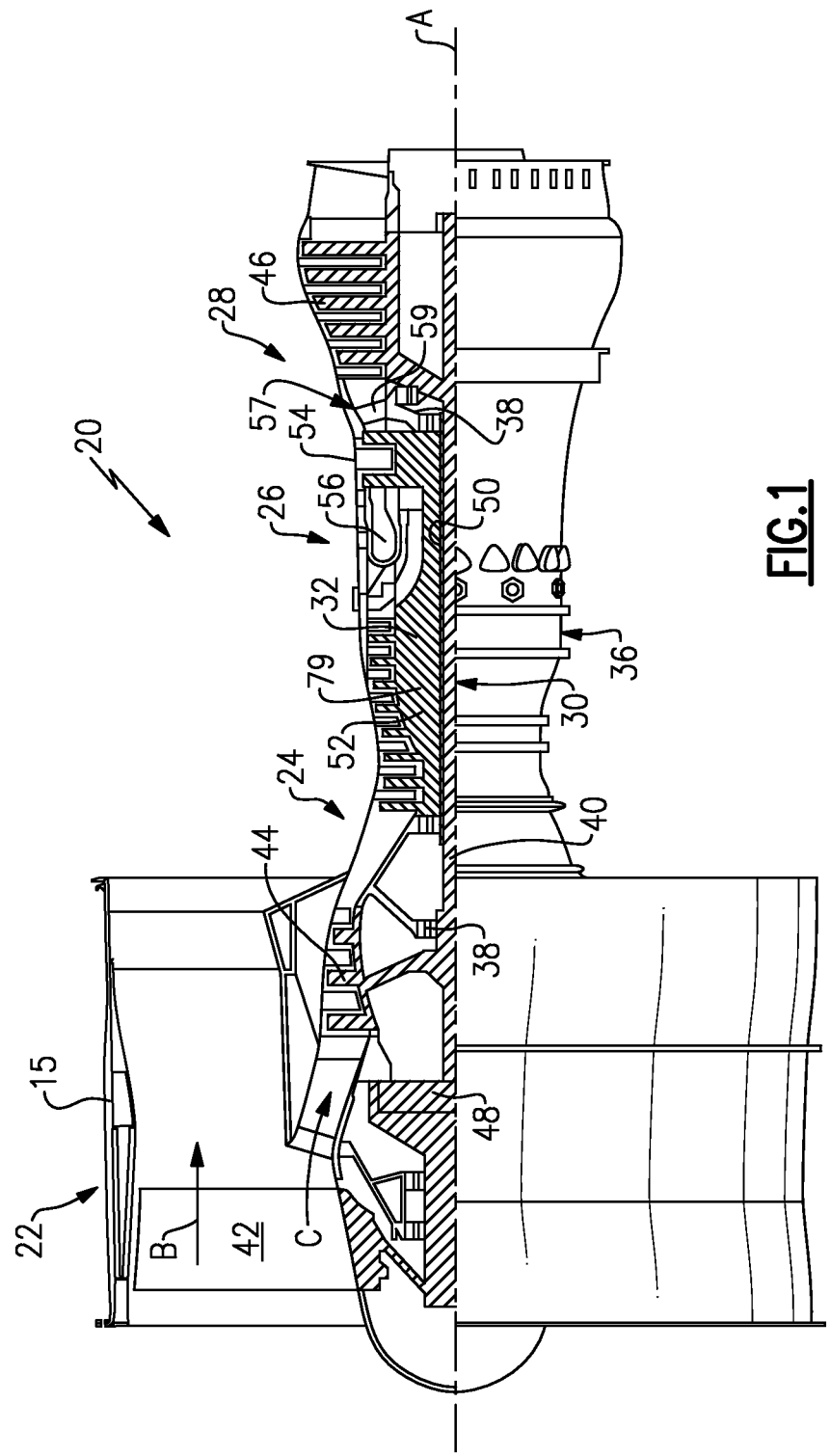
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/second (350.5 meters/second).

Figure 2:
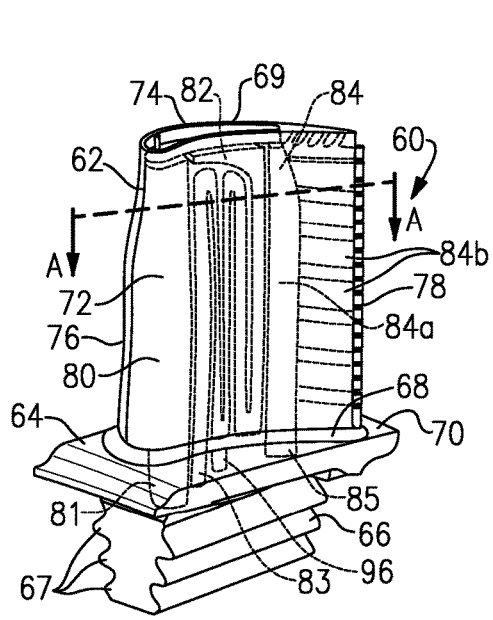
FIG. 2 illustrates an example airfoil structure.

FIG. 2 illustrates an example airfoil structure 60 including an airfoil 62, a platform 64, and a root portion 66. In the illustrated example, the airfoil structure 60 is a turbine blade. However, airfoil structure 60 could also be a compressor blade. The airfoil 62 includes a pressure side 72 and a suction side 74 separated by a leading edge 76 and a trailing edge 78. The pressure side 72 of the airfoil structure 60 is generally concave and the opposing suction side 74 is generally convex. A first airfoil end 68 is rigidly attached to a radially outer side 70 of the platform 64 and a second airfoil end 69 is spaced from the platform 64.

The platform 64 forms an inner boundary layer for the gas path traveling over the airfoil structure 60. The root portion 66 extends radially inward from the platform 64 to retain the airfoil structure 60 to a rotor 79 (FIG. 1). The root portion 66 is located on an opposite side of the platform 64 from the airfoil 62 and includes ribs 67 for engaging complimentary shaped receptacles on the rotor 79.

Figure 3:
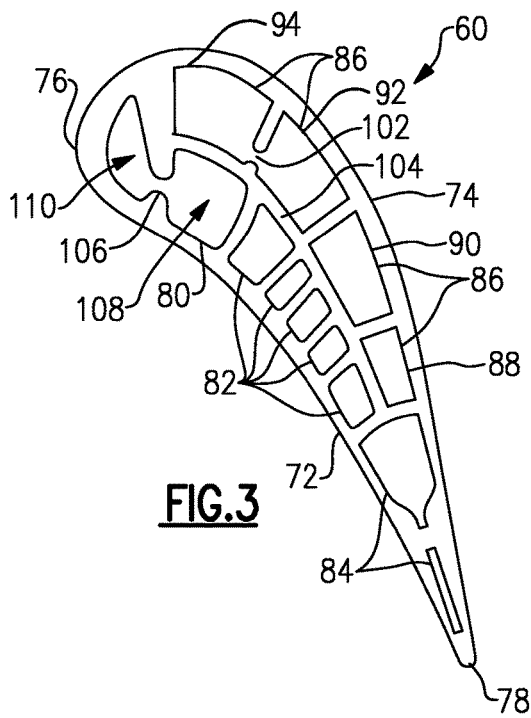
FIG. 3 illustrates a cross-sectional view of the airfoil structure taken along line AA of FIG. 2.

As shown in FIGS. 2 and 3, the airfoil structure 60 includes a leading edge cooling circuit 80, a pressure side cooling circuit 82, a trailing edge cooling circuit 84, and a suction side cooling circuit 86. In one example, the leading edge cooling circuit 80, the pressure side cooling circuit 82, the trailing edge cooling circuit 84, and the suction side cooling circuit 86 are fluidly isolated from each other.

The leading edge cooling circuit 80 extends around the leading edge 76 and partially onto the pressure side 72 of the airfoil 62. An inlet 81 to the leading edge cooling circuit 80 extends through the root portion 66 and the platform 64 to direct the cooling air from the compressor section 24 through the airfoil structure 60 into the leading edge cooling circuit 80. The leading edge cooling circuit 80 includes impingement jets 106 fluidly connecting a feed cavity 108 and a leading edge cavity 110 for cooling the leading edge 76 of the airfoil 62.

The pressure side cooling circuit 82 includes multiple passages extending in a general serpentine pattern along the pressure side 72 of the airfoil 62. An inlet 83 to the to the pressure side cooling circuit 82 extends through the root portion 66 and the platform 64 to direct cooling air from the compressor section 24 through the airfoil structure 60 into the pressure side cooling circuit 82. A central wall 104 separates the suction side cooling circuit 86 from the pressure side cooling circuit 82.

The trailing edge cooling circuit 84 includes a radially extending passage 84a with multiple trailing edge passages 84b extending in a general axial direction through the trailing edge 78. An inlet 85 to the trailing edge cooling circuit 84 extends through the root portion 66 and the platform 64 to direct cooling air from the compressor 24 through the airfoil structure 60 into the trailing edge cooling circuit 84.

Figure 4:
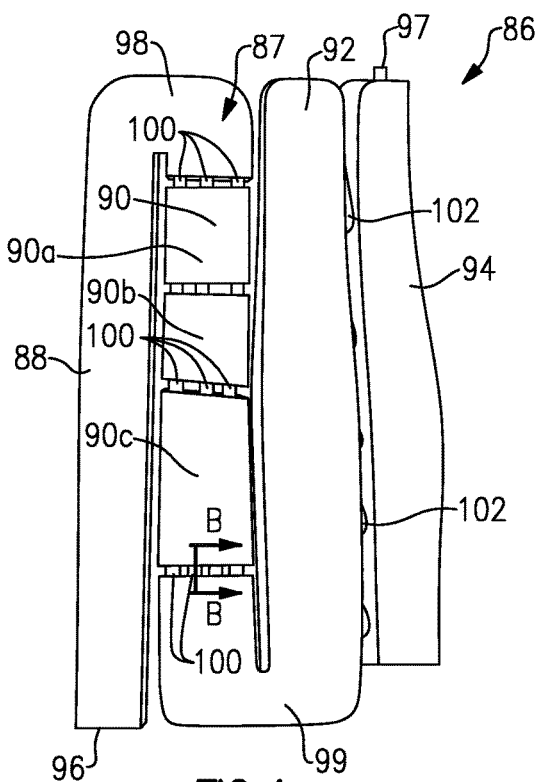
FIG. 4 illustrates an example cooling circuit.

FIG. 4 illustrates the suction side cooling circuit 86 including a suction side face 87 located adjacent the suction side 74 of the airfoil 62. In this example, the suction side cooling circuit 86 includes a first longitudinal section 88, a second longitudinal section 90, a third longitudinal section 92, and a fourth longitudinal section 94. The first, second, third, and fourth longitudinal sections 88, 90, 92, and 94 form a serpentine pattern and extend in a radial direction.

Cooling fluid, such as air, from the compressor section 24 enters the suction side cooling circuit 86 at an inlet 96 and travels through the first longitudinal section 88 radially outward until the cooling fluid reaches a first U-shaped bend 98 to direct the cooling fluid into the second longitudinal section 90.

The second longitudinal section 90 includes a first segment 90a, a second segment 90b, and a third segment 90c connected by at least one impingement hole 100. The first, second, and third segments 90a, 90b, and 90c form chambers that collect the cooling fluid after the cooling fluid passes through the at least one impingement hole 100.

The at least one impingement hole 100 directs the cooling fluid in a direction 101 of the suction side face 87 and the suction side 74 of the airfoil 62. The direction 101 is also directed towards the direction of rotation of the airfoil 62 to counteract the coriolis effect which directs the cooling fluid towards the pressure side 72 of the airfoil 62.

Figure 5:
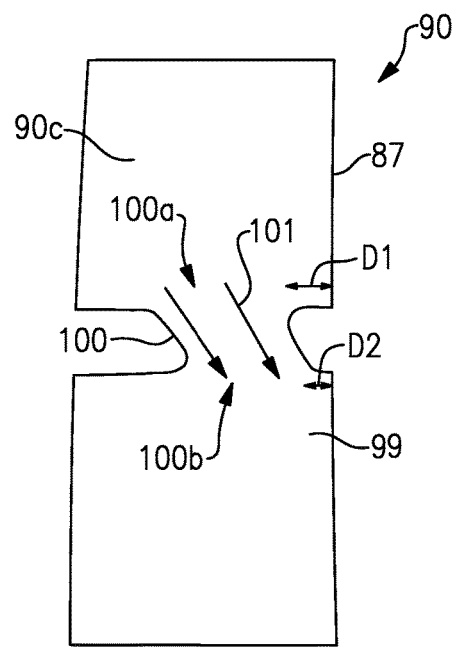
FIG. 5 illustrates a cross-sectional view taken along line BB of FIG. 4.

The impingement hole 100 directs between approximately 20% and approximately 70% of the cooling fluid toward the suction side 74 in the direction of rotation of the gas turbine engine 20. As shown in FIG. 5, an outlet 100b of the impingement hole 100 is spaced a distance D2 from the suction side face 87 and an inlet 100a of the impingement passage 100 is spaced a distance D1 from the suction side face 87 as shown in FIG. 5. In this example, the distance D1 is greater than the distance D2.

In the illustrated example, the first U-shaped bend 98 and the first, second, and third segments 90a, 90b, and 90c are fluidly connected with three impingement holes 100 and the third segment 90c and a second U-shaped bend 99 are fluidly connected by four impingement holes 100. However, one impingement hole or more than four impingement holes could be utilized to direct the cooling fluid towards the suction side 74 of the airfoil 62. The impingement holes 100 could also be located in the first longitudinal section 88, the third longitudinal section 92, or the fourth longitudinal section 94.

The third longitudinal section 92 is fluidly connected to the fourth longitudinal section 94 by at least one transverse passage connection 102. The transverse passage connection 102 extends from a lateral side of the third longitudinal section 92 to a lateral side of the fourth longitudinal section 94. Therefore, cooling fluid entering the third longitudinal section 92 from the second U-shaped bend 98 must travel through the at least one transverse passage connection 102 before the cooling fluid can enter the fourth longitudinal section 94. The cooling fluid exits the fourth longitudinal section 94 through an exit 97.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil structure for a gas turbine engine comprising:
   a platform including a radially inner side and a radially outer side;
   a root portion extending from the radially inner side of the platform; and
   an airfoil extending from the radially outer side of the platform, the airfoil including a suction side cooling circuit with at least two radially spaced segmented passages connected by at least one impingement passage, wherein the airfoil includes a central wall and a pressure side cooling circuit with the central wall dividing the pressure side cooling circuit and the suction side cooling circuit.

2. The airfoil structure of claim 1, wherein the at least one impingement passage defines a centerline with a first component directed toward a suction side of the airfoil and a second component directed in a radially direction.

3. The airfoil structure of claim 2, wherein the at least one impingement passage includes an inlet and an outlet and the inlet is spaced a first distance from the suction side of the airfoil and the outlet is spaced a second distance from the suction side of the airfoil with the first distance being greater than the second distance.

4. The airfoil structure of claim 3, wherein a suction side wall of the airfoil at least partially defines the at least two radially spaced segments.

5. The airfoil structure of claim 1, wherein the suction side cooling circuit includes at least one section extending longitudinally along a suction side of the airfoil.

6. The airfoil structure of claim 5, wherein the at least one section includes the at least two radially spaced segmented passages.

7. The airfoil structure of claim 6, wherein the at least one section includes multiple sections connected by u-shaped bends to form a serpentine pattern along the suction side of the airfoil.

8. The airfoil structure of claim 1, wherein an outlet of the impingement passage is directed radially inward from an inlet of the impingement passage toward a suction side of the airfoil.

9. The airfoil structure of claim 1, wherein the pressure side cooling circuit extends along a pressure side of the airfoil, a leading edge cooling circuit extending along a leading edge of the airfoil, and a trailing edge cooling circuit extending along a trailing edge of the airfoil.

10. A gas turbine engine section comprising:
a rotor configured to rotate about an axis of rotation;
an airfoil structure including:
a root portion configured to engage the rotor;
an airfoil including a suction side cooling circuit having multiple radially spaced segmented passages connected by at least one impingement passage; and
a pressure side cooling circuit extending along a pressure side of the airfoil, a leading edge cooling circuit extending along a leading edge of the airfoil, a trailing edge cooling circuit extending along a trailing edge of the airfoil and a central wall dividing the pressure side cooling circuit from the suction side cooling circuit.

11. The gas turbine engine section of claim 10, wherein the at least one impingement passage defines a centerline with a first component extending in a direction of rotation of the rotor and a second component extending radially.

12. The gas turbine engine section of claim 10, wherein the at least one impingement passage includes an inlet and an outlet, and the inlet is spaced a first distance from a suction side of the airfoil and the outlet is spaced a second distance from the suction side of the airfoil with the first distance being greater than the second distance.

13. The gas turbine engine section of claim 10, wherein the suction side cooling circuit includes multiple longitudinally extending passages connected by u-shaped bends to form a serpentine pattern adjacent a suction side of the airfoil and at least one of the longitudinally extending passages includes the multiple radially spaced segmented passages connected by the at least one impingement passage.

14. A method of cooling an airfoil for a gas turbine engine comprising:
directing a cooling fluid into multiple passages extending through a suction side of an airfoil, wherein the airfoil includes a pressure side cooling circuit extending along a pressure side of the airfoil, a leading edge cooling circuit extending along a leading edge of the airfoil, a trailing edge cooling circuit extending along a trailing edge of the airfoil and a central wall dividing the pressure side cooling circuit from the suction side cooling circuit;
directing the cooling fluid from a first one of the multiple passages through at least one impingement passage directed toward a suction side of the airfoil and into a second one of the multiple passages spaced radially from the first one of the multiple passages.

15. The method as recited in claim 14, wherein the at least one impingement passage includes an inlet and an outlet and the inlet is spaced a first distance from the suction side of the airfoil and the outlet is spaced a second distance from the suction side of the airfoil with the first distance being greater than the second distance.

16. The method as recited in claim 15, wherein between 20% and 70% of the cooling fluid is directed in the direction of rotation of the gas turbine engine.

17. The method of claim 15, further comprising directing the cooling fluid through the first one of the multiple passages and the second one of the multiple passages in a serpentine pattern with a u-shaped bend connecting the first one of the multiple passages and the second one of the multiple passages, wherein the first one of the multiple passages and the second one of the multiple passages extend longitudinally between opposing radial ends of the airfoil.

* * * * *